United States Patent [19]

Harrington et al.

[11] Patent Number: 5,626,007
[45] Date of Patent: May 6, 1997

[54] ROTARY CUTTER WITH REVERSIBLE COUNTERROTATION GEARBOX

[75] Inventors: Jackie L. Harrington, Selma; Fred W. Lurwig, Marion Jct., both of Ala.

[73] Assignee: Allied Products Corporation, Chicago, Ill.

[21] Appl. No.: 526,274

[22] Filed: Sep. 11, 1995

Related U.S. Application Data

[63] Continuation-in-part of Ser. No. 319,937, Oct. 7, 1994, Pat. No. 5,450,714.

[51] Int. Cl.$^6$ .................... A01D 34/66; A01D 34/76
[52] U.S. Cl. .................... 56/13.5; 56/295; 56/DIG. 6; 74/665 GB
[58] Field of Search .................... 56/12.7, 13.5, 56/255, 503, DIG. 6, 295, 17.5; 74/665 GB

[56] References Cited

U.S. PATENT DOCUMENTS

| | | |
|---|---|---|
| 269,264 | 12/1882 | Cloyd . |
| 842,757 | 1/1907 | Blood . |
| 2,171,750 | 9/1939 | Hooe . |
| 2,443,027 | 6/1948 | Dishmaker . |
| 2,486,799 | 11/1949 | Oppenheim . |
| 2,504,268 | 4/1950 | Lee . |
| 2,614,440 | 10/1952 | Richey . |
| 2,701,942 | 2/1955 | Caldwell, Jr. et al. . |
| 2,795,914 | 6/1957 | Smith . |
| 2,891,369 | 6/1959 | Rietz . |
| 3,385,043 | 5/1968 | Seymore . |
| 3,478,620 | 11/1969 | Shimanckas . |
| 3,503,274 | 3/1970 | Howard . |
| 3,618,304 | 11/1971 | Hundhausen . |
| 4,090,346 | 5/1978 | Doi . |
| 4,196,568 | 4/1980 | Perry . |
| 4,287,790 | 9/1981 | Fujiwara et al. . |
| 4,526,180 | 7/1985 | Scott et al. . |
| 4,573,269 | 3/1986 | Hernandez . |
| 4,634,403 | 1/1987 | Peabody et al. . |
| 4,696,199 | 9/1987 | Fabbri . |
| 4,858,492 | 8/1989 | Takano et al. .................... 74/745 |
| 4,900,292 | 2/1990 | Berry et al. .................... 474/84 |
| 4,919,244 | 4/1990 | Bondioli .................... 192/56 R |
| 4,926,623 | 5/1990 | Fiener .................... 56/60 |
| 5,065,639 | 11/1991 | Flanhardt et al. .................... 74/417 |
| 5,077,959 | 1/1992 | Wenzel .................... 56/11.1 |
| 5,127,215 | 7/1992 | Wenzel .................... 56/11.1 |
| 5,450,714 | 9/1995 | Lurwig .................... 56/13.5 |

Primary Examiner—Terry Lee Melius
Attorney, Agent, or Firm—Lockwood, Alex, Fitzgibbon & Cummings

[57] ABSTRACT

A rotary cutter apparatus is provided for shredding vegetation in order to generally reduce the size of cut vegetation and more evenly distribute the vegetation once thus cut. Counterrotating, coaxial blade assemblies are provided. A multiple gear drive shaft has one drive gear for engaging and driving one blade assembly and another drive gear for engaging and driving the other blade assembly. The multiple gear drive shaft also has an interchangeability characteristic which determines the respective rotational directions of the counterrotating blade assemblies. Enhanced gear and bearing lubrication is also achieved.

25 Claims, 5 Drawing Sheets

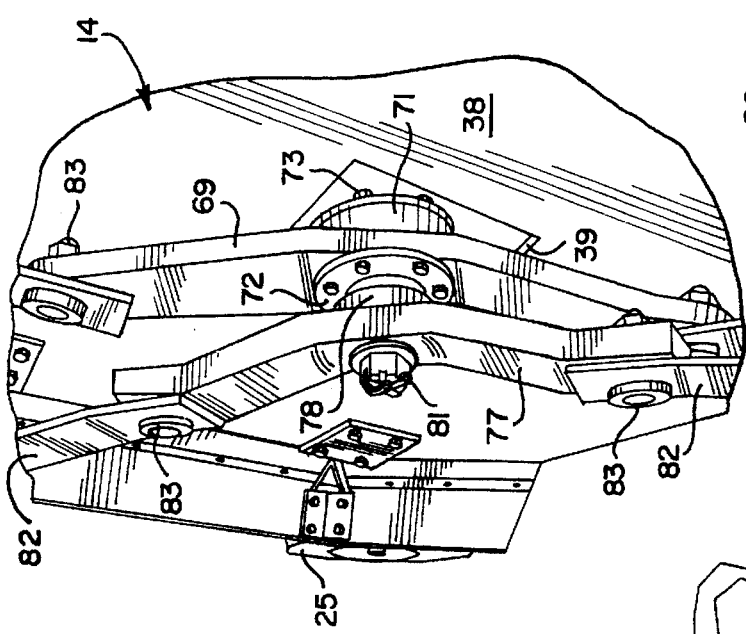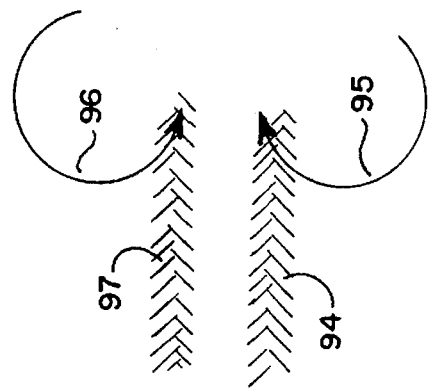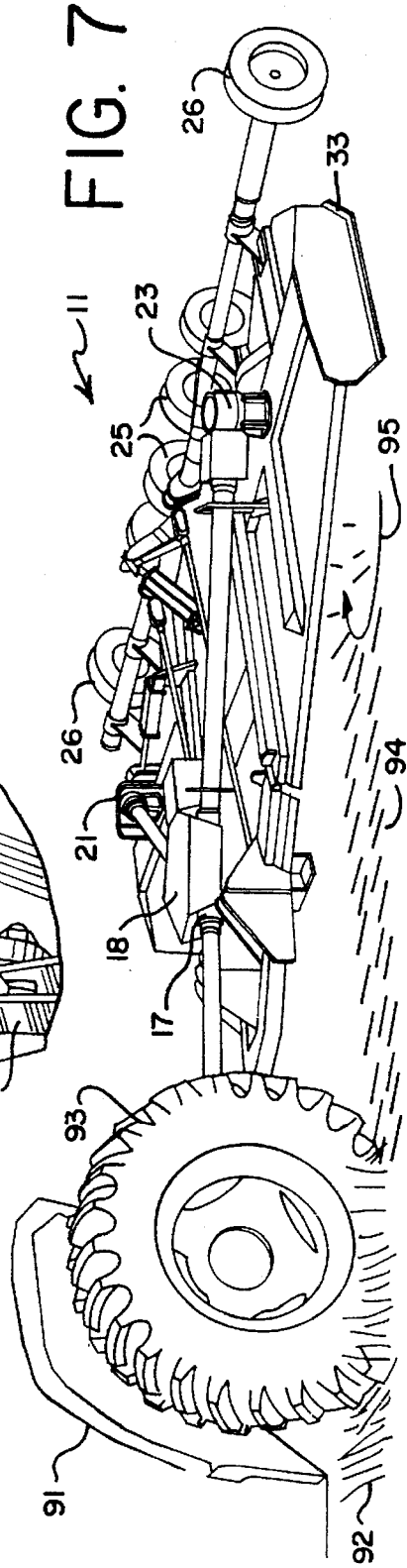

ROTARY CUTTER WITH REVERSIBLE COUNTERROTATION GEARBOX

DESCRIPTION

This is a continuation-in-part of application Ser. No. 08/319,937, filed Oct. 7, 1994, now U.S. Pat. No. 5,450,714.

BACKGROUND AND DESCRIPTION OF THE INVENTION

The present invention generally relates to machinery for cutting and shredding vegetation by the use of double-shredding action effected by dual counterrotating blade assemblies which are reversible. More particularly, the invention is a rotary cutter apparatus which cuts and shreds by blades, some of which rotate in a clockwise direction and others in a counterclockwise direction, and that is particularly designed for cutting down and shredding post-harvest stubble, for clearing fields of coarse vegetation, for mowing and mulching grassy areas, and the like. The invention finds special application in connection with wide-swathed agricultural and commercial rotary cutting equipment.

Rotary cutters are well-known in the agricultural industry. They can vary in size and type including single deck equipment, multiple deck equipment, and equipment having decks that can be tilted up and down for cutting on large contoured fields, for example. Typically, this equipment is pulled by a pulling vehicle such as a tractor and is driven by the power take-off (PTO) shaft of the pulling vehicle. Rotary cutters are especially designed for rugged, heavy-duty use and can often accommodate and cut numerous types of vegetation including thick-stalked plants, saplings, small diameter trees, and the like. Rotary cutters are available in various types and sizes for handling various cutting tasks from general pasture clipping to farm and commercial operations. Often, these are heavy-duty machines built for long hours of rugged cutting.

Present day commercial rotary cutters have either a single blade assembly or have multiple blade assemblies that do not lie along coinciding axes of rotation. Generally speaking, these cutters achieve good cutting results insofar as they sever the vegetation to cut it down. However, this traditional approach has limited effectiveness in shredding the vegetation during the cutting operation. Under many conditions, the cut vegetation passes out of and behind the rotary cutter in large clumps or elongated pieces. The final result can be a cut path that is slow to decompose because of the elongated size and density of the severed vegetation. While some shredding action can occur in order to speed decomposition of the cut vegetation, its effectiveness is limited and adversely affected by vegetation size and type and by cutting conditions.

It has been proposed to provide a rotary cutter having double counterrotating blades in order to attempt to achieve a double-shredding action by the rotary cutter. Objectives include promoting more rapid decomposition, destruction of insects such as boll weevils, corn bores and the like, while improving evenness of spreading for reducing windrowing of the cut vegetation. Such a proposed structure is found in U.S. Pat. No. 3,385,043 to Seymore.

The gearbox and drive train assembly disclosed by the Seymore patent has been found to exhibit defects that seriously impair the mechanical viability, repairability, maintenance and serviceability of the gearbox and drive train. In addition, this proposed cutter requires difficult machining procedures and is very susceptible to misalignment of bearing assemblies, leading to significant reduction in bearing life. For example, the Seymore patent teaches that its center shaft is supported by three bearing assemblies, and they are of the tapered roller bearing type. This entails close machining procedures and tight tolerances and generally complicates and substantially increases the difficulty of adjustment for proper bearing alignment. Also, certain components are welded or force-fit together, which eliminates or seriously restricts adjustability, while also creating situations in which entire assemblies must be replaced because the assemblies cannot be readily disassembled without serious damage to or misalignment of component parts. It will be appreciated that misalignment of and/or damage to drive train components that rotate at a relatively high speed will be detrimental to the equipment, including noise development and working life reduction.

It has been found that, by the improvements embodied in the present invention, these shortcomings and difficulties of units such as those disclosed in the Seymore patent are virtually avoided while still achieving the advantageous objectives that are specified in the Seymore patent with respect to providing double shredding action by co-axial double counterrotating blades.

Furthermore, in many applications, it is important that the blade closer to the ground rotate in a direction which is especially advantageous for cutting patterns which vary depending upon the location of the cutting unit. For example, when a cutting unit is positioned such that it cuts an area which includes a track of matted-down crop formed when a tire or the like of a tractor or other pulling vehicle runs through the crop or grass to be cut down, it is important that the blade closer to the ground rotates in a direction which will assist in lifting the matted crop or grass into this blade for more effective cutting. Because cutting units of the invention include multiple blades along the same spindle, manufacturing the units to have the desired blade rotation pattern is of greater complexity. Accordingly, it is further advantageous to provide a multiple-blade spindle assembly having components which facilitate blade rotation reversal to construct rotary cutters which have counterrotating blade assemblies within which the bottom blade rotates in a direction that is best for crop cutting efficiency.

In summary, the present invention effects these improvements by providing a rotary cutter having at least one deck assembly which supports and houses a gearbox drive assembly for driving both an upper blade assembly and a lower blade assembly which counterrotate with respect to each other along the same axis of rotation in order to achieve the shredding action that is characteristic of the present invention. The blade gearbox drive assembly includes a rotatably mounted driven output shaft which drives the lower blade assembly. Also included is a rotatably mounted driven output tube for driving the upper blade assembly and for receiving the output shaft that passes through the output tube. Preferably, only two bearing assemblies mount the output shaft, and the output tube is removably attached to the gearbox drive gear for the upper blade assembly in order to ensure that both the output tube and the drive gear are replaceable without damage to the other. It is also preferred that the drive tube and the upper blade assembly are removably secured to one another. The gearbox has a component construction whereby the driving gears are easily interchanged so as to reverse the respective rotation directions of both of the blades within a given spindle assembly.

It is a general object of the present invention to provide an improved rotary cutter with reversible counterrotation gearbox and blade drive assembly.

Another object of this invention is to provide an improved rotary cutter reversible counterrotation gearbox that prevents misalignment of bearings and side loading of drive shafts, while improving bearing life.

Another object of the present invention is to provide an improved rotary cutter reversible counterrotation gearbox that facilitates assembly and serviceability and that avoids situations leading to component damage when disassembly and/or service are required.

Another object of the present invention is to provide an improved rotary cutter having reversible counterrotating dual blade assemblies and including an easy attachment blade assembly for facilitating servicing, repair or replacement of the blade assembly or of its blades.

Another object of this invention is to provide an improved rotary cutter multiple-blade spindle assembly that has component parts which are reversible so as to select the bottom blade rotational direction which is best for a particular rotary cutter and/or cutting situation.

A further object of the present invention is to provide a gearbox for a spindle assembly within which the uppermost drive components are directly within a lubrication bath.

These and other objects, features and advantages of the present invention will be clearly understood through a consideration of the following detailed description.

BRIEF DESCRIPTION OF THE DRAWINGS

The invention will be further elucidated in the following description with reference to the drawings in which:

FIG. 6 is a perspective, detail view of the counterrotation drive assembly as illustrated in FIG. 4 or FIG. 5;

FIG. 7 is a perspective view of the rotating cutter which illustrates somewhat schematically the importance of proper blade rotation with respect to matted-down crop; and FIG. 8 is a schematic view of crop matting patterns addressed by the present invention.

DESCRIPTION OF THE PARTICULAR EMBODIMENTS

Figure 1:
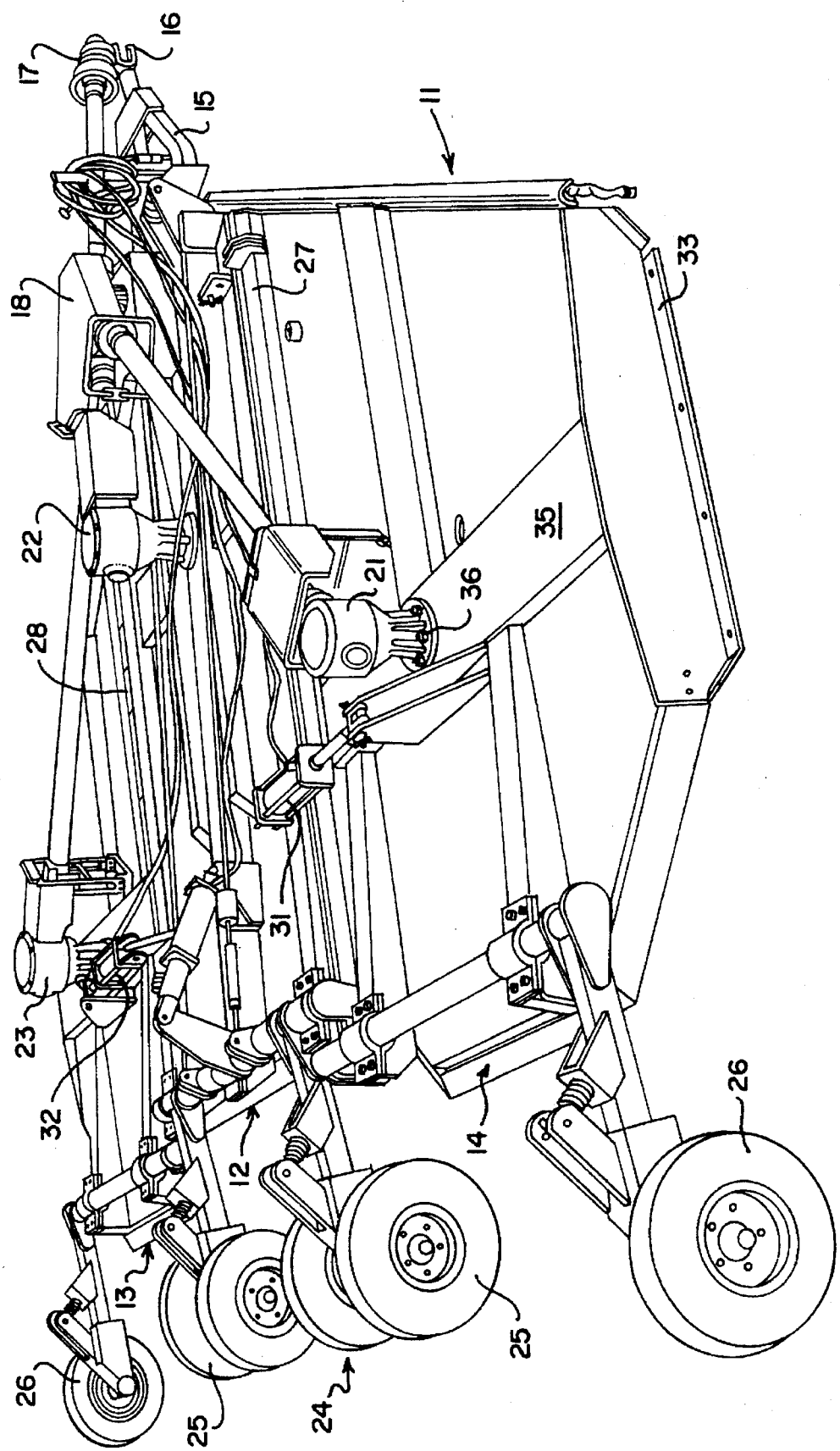
FIG. 1 is a perspective view of a rotary cutter exemplifying a type of rotary cutter within which the present invention can be incorporated.

A rotary cutter, generally designated as 11 in FIG. 1, is illustrative of the type of rotary cutter within which the present invention can be embodied. It will be understand that various other types of rotary cutters can be improved by incorporating the present invention. These include rotary cutters that are of the single deck variety and those which have multiple decks of a lesser or greater number than the three decks shown in the illustrated rotary cutter. The decks may be articulated or not. The rotary cutters may be propelled and/or powered by a separate vehicle, or they may be self-propelled and/or self-powered.

With further reference to the illustrated rotary cutter, it is of the multiple-deck variety and includes a center deck assembly 12 and two opposing side deck or wing assemblies 13, 14. A tongue 15 and clevis hitch 16 are provided for securing the illustrated rotary cutter 11 to a pulling vehicle such as a tractor 91 (FIG. 7). A drive shaft assembly 17 receives rotating power from the PTO of the pulling vehicle. A power divider gearbox 18 transfers the rotational power from the PTO source to the individual gearbox assemblies 21, 22, 23.

Travel through fields and the like is facilitated by wheel and axle assembly 24 which includes main body wheels 25 and wing wheels 26. Each wing assembly is secured to the main body or center deck assembly 12 by a hinge assembly 27, 28. Lift cylinders 31, 32 retract and extend in order to raise and lower, respectively, the wings in a well-known manner. Wing skids 33 can be included in order to facilitate movement along the ground.

Figure 2:
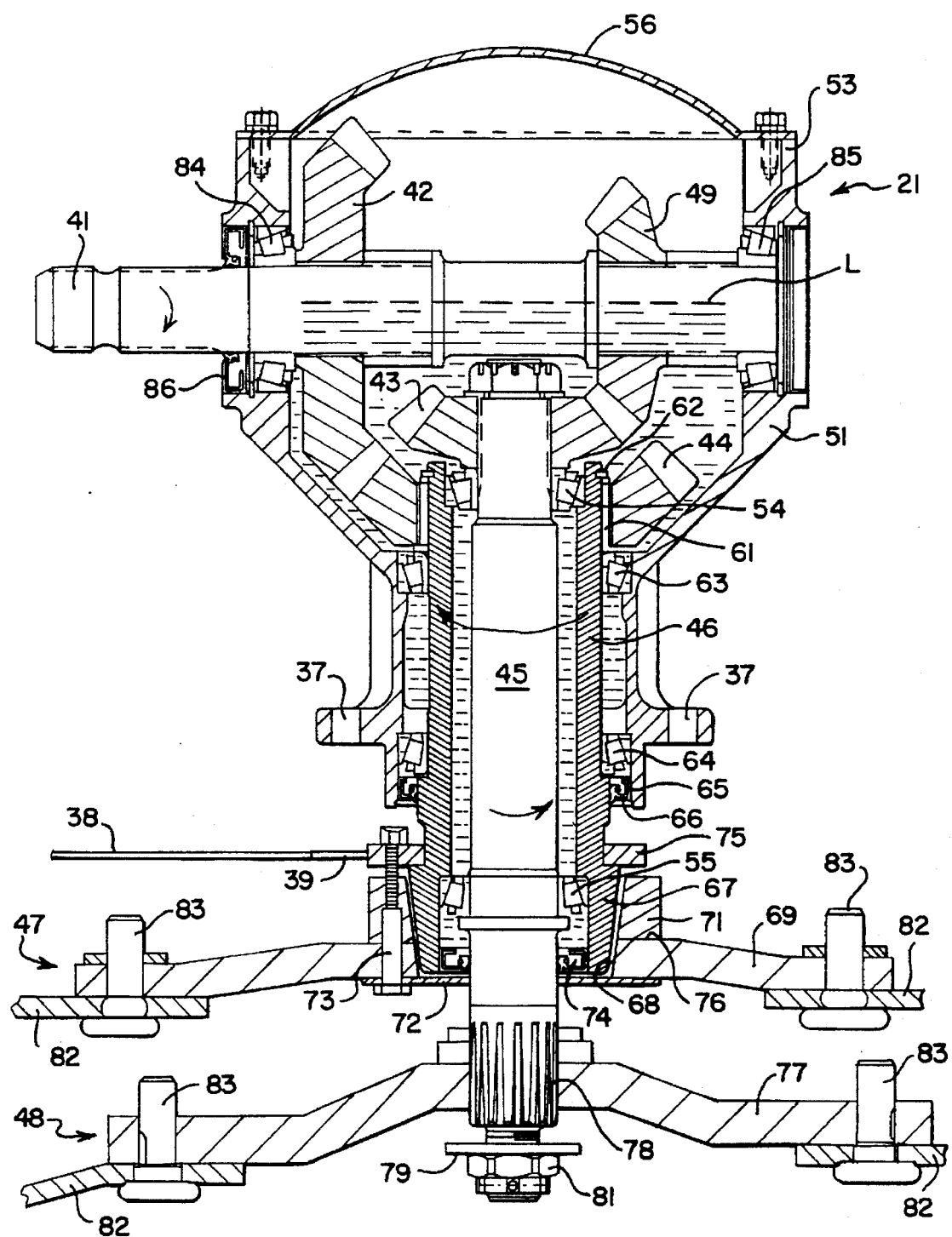
FIG. 2 is a cross-sectional view through a gearbox and drive assembly for the rotary cutter shown in FIG. 1, which assembly is arranged for counterrotation of the blades in a first pattern.
Figure 3:
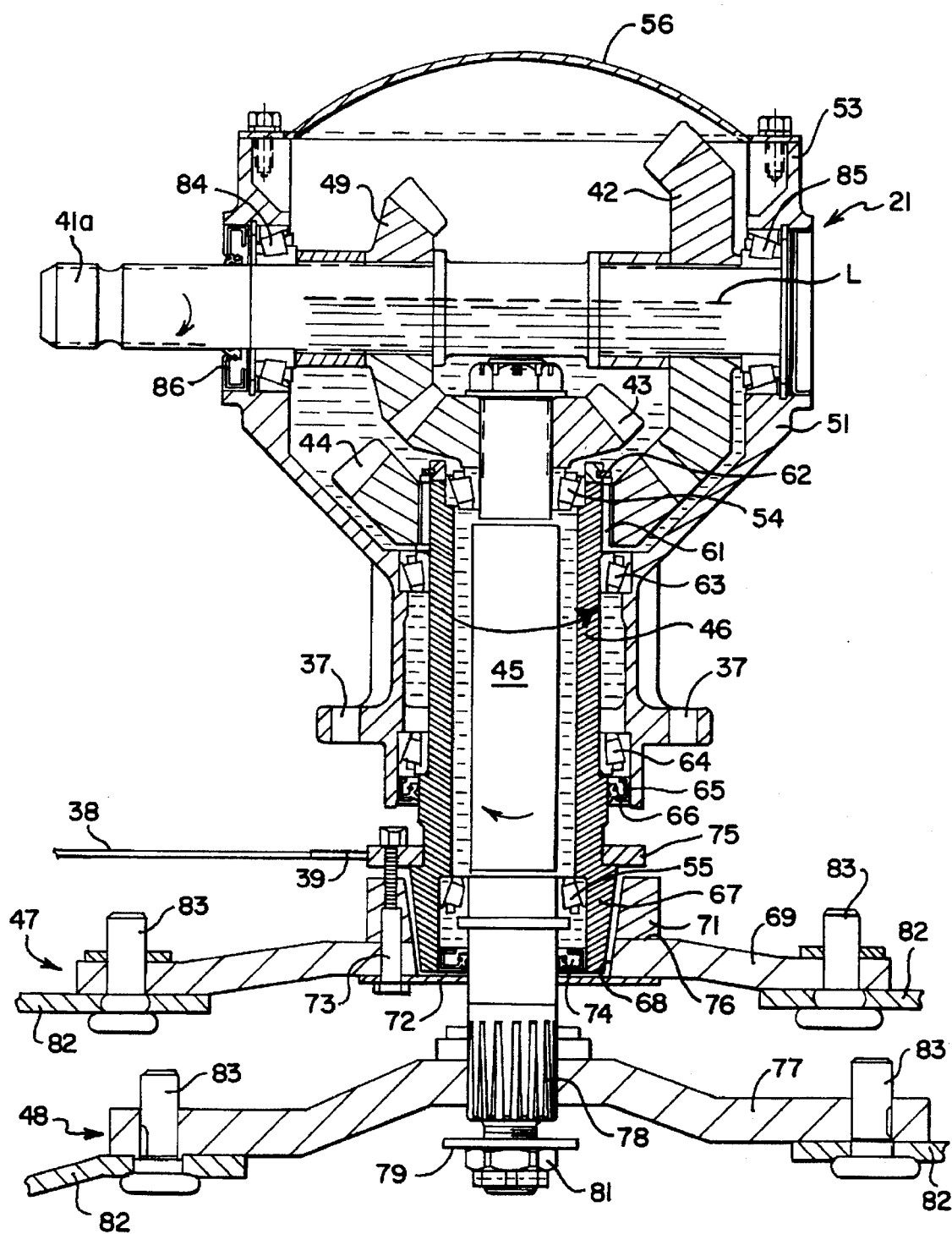
FIG. 3 is a cross-sectional view through another gearbox and drive assembly as in FIG. 2 but which is arranged for counterrotation of the blades in a pattern which is the reverse of the first pattern shown in FIG. 2.

During the course of the following description emphasis will be placed upon the gearbox assembly 21 and its associated components. It will be understood that the same structural features are to be found in other gearbox assemblies and associated components in accordance with the present invention. The illustrated deck assembly 14 includes a gearbox stand or raised cross member 35 through which mounting bolts 36 pass for securing the gearbox assembly 21 to the side deck or wing assembly 14, the bolts 36 passing through holes 37 (FIGS. 2 and 3). A deck plate 38 defines the cutting chamber and accommodates rotation of the blade assemblies such as by incorporating a cut-out 39 therethrough.

With more particular reference to the gearbox assembly 21, an input shaft 41 transmits the rotative power from the PTO or the like and into the gearbox assembly. Mounting of the input shaft 41 includes cone bearing assemblies 84, 85 and a seal 86.

In the illustrated embodiment, the gearbox assembly includes a double bevel gear drive shaft 41 including a larger-diameter drive gear 42 and a smaller-diameter drive gear 49. This double bevel gear drive shaft 41 can be of unitary construction or made of components assembled to take on the configuration of either FIG. 2 or FIG. 3. Drive gears 42 and 49 respectively engage either an upper driven gear 43 or a lower driven gear 44. Upper driven gear 43 is secured to and drives driven output shaft or inner shaft 45, and lower driven gear 44 is secured to and drives driven output tube or outer barrel 46. It will be noted that driven output shaft 45 passes through driven output tube 46.

An upper blade assembly, generally designated as 47, is releasably secured to the driven output tube 46, while a lower blade assembly, generally designated as 48, is secured to the driven output shaft 45. It will be appreciated that, upon rotation of the double-geared input shaft 41, the upper driven gear 43 and lower driven gear 44 will rotate in opposite directions along the same axis. This rotational movement is in turn transmitted to the blade assemblies 48, 47, respectively, through the driven output shaft 45 and driven output tube 46, respectively. The result is coaxial counterrotation of the upper blade assembly and lower blade assembly with respect to each other. This blade counterrotation mode is illustrated in FIG. 4.

With reference to FIG. 3, a modified double bevel gear drive shaft 41a is shown. When compared with double bevel gear drive shaft 41, the blade counterrotation is reversed; that is, the blade counterrotation of the FIG. 3 arrangement is illustrated in FIG. 5.

Figure 4:
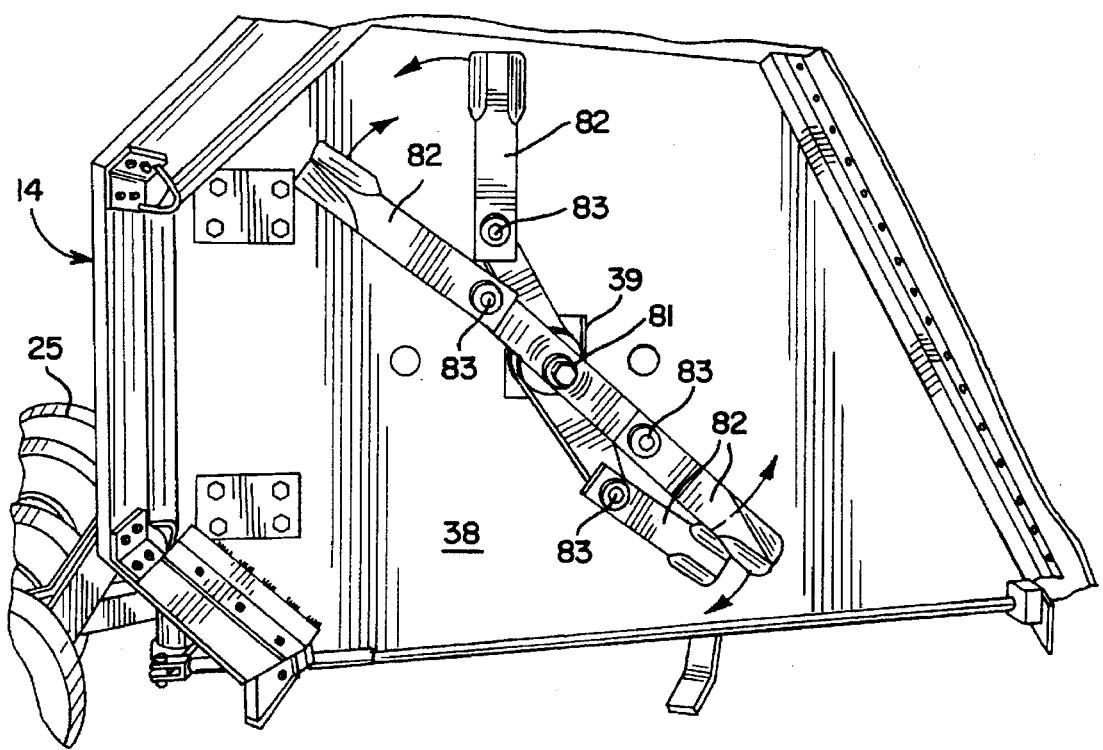
FIG. 4 is a perspective view illustrating the counterrotation pattern of the blade assembly of FIG. 2 shown with one of its decks tilted in an upright manner.

It will be noted that, in FIG. 2 the shaft 41 is assembled such that the larger-diameter drive gear 42 (which drivingly engages the lower driven gear 44 and thus the upper blade assembly 47) is on the input-end side or portion of the gearbox, resulting in upper blade rotation as designated by arrows in FIG. 2 and FIG. 4. Correspondingly, the smaller-diameter drive gear 49 is mounted on the end portion of the shaft 41 which is generally opposite of the input-end side of the gearbox, resulting in the lower blade rotation direction as designated by arrows in FIG. 2 and FIG. 4.

Figure 5:
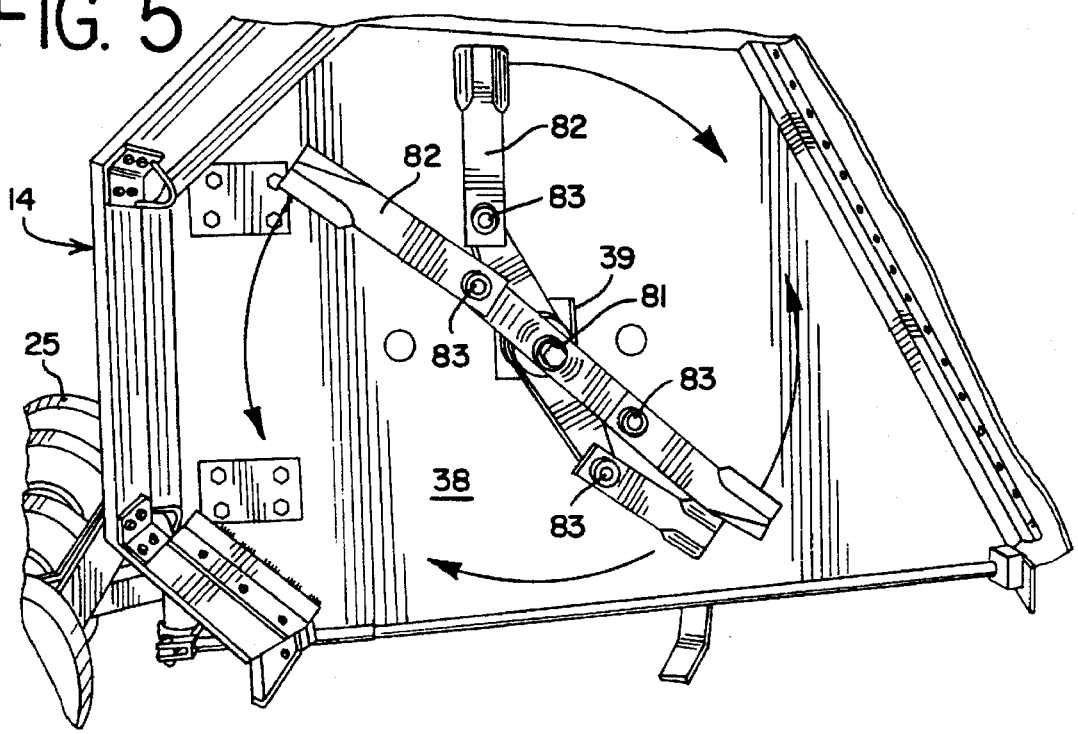
FIG. 5 is a perspective view illustrating the counterrotation pattern of the blade assembly of FIG. 3.

It will further be noted that, in FIG. 3 the shaft 41a is assembled such that the smaller-diameter drive gear 49 is on the input-end side or portion of the gearbox, resulting in the lower blade rotation direction as designated by arrows in FIG. 3 and FIG. 5. Correspondingly, the larger-diameter drive gear 42 is mounted on the opposite end portion of the shaft 41a, resulting in the upper blade rotation direction as designated by arrows in FIG. 3 and FIG. 5.

Body housing 51 generally encloses the bevel gear assembly and mounts to the gearbox stand or raised cross member 35 of the deck assembly by virtue of the bolts 36 and the holes 37. A removable top housing 53 provides ready access to the interior of the gearbox housing assembly.

In an important aspect of the invention, the driven output shaft 45 is mounted within two bearing assemblies 54 and 55. These bearing assemblies may be so-called tapered bearings or tapered roller bearings. Such tapered bearings require fine adjustment to be certain that complementary tapered bearings offset one another so as to prevent up and down movement of the shaft. The bearing assemblies could be spherical bearing assemblies or needle bearing assemblies. For example, the upper bearing assembly 54 could be a spherical bearing assembly, and the lower bearing assembly 55 could be a needle bearing assembly. A combination of a spherical bearing along one end portion of the shaft and a needle bearing along the other end portion of the shaft provides the up and down support required while substantially decreasing and virtually eliminating the need for bearing adjustments. Also, the provision of two bearing assemblies rather three bearing assemblies greatly simplifies machining requirements for the components which mount and which are mounted by these bearing assemblies.

It has been found that, without meticulous adjustment and precision machining, the driven output shaft in a three-bearing arrangement typically will experience side loading, which usually results in reduced life of the bearings. The three-bearing approach requires the difficult operation of machining three surfaces on a common axis.

Concerning the illustrated manner of mounting the upper bearing assembly 54, it can conveniently be mounted without a seal inasmuch as this bearing assembly is totally covered by oil or other lubrication for contact with the bearing surfaces. A cover 56 retains the lubrication within the gearbox, the lubrication typically being at a level "L" which is about midway of the shaft 41. It will be appreciated that, with the gearbox and shaft assembly of the present invention, all gears and bearing assemblies are fully or partially within the oil bath. Thus, direct lubrication is achieved without requiring pumps or pumping or splashing action to properly lubricate the gears and bearings.

The lower driven bevel gear 44 is removably mounted with respect to the driven outer tube 46 which it drives. In the exemplified mounting arrangement a keyway and key 61 and retaining ring or snap ring 62 retain this assembly in an easily removable yet secure manner. Snap ring 62 positions within the illustrated annular groove in the outer tube or barrel 46. In those instances where a bevel gear becomes worn or damaged, it can be easily assembled to and disassembled from the overall assembly, particularly to and from the driven tube or barrel 46. This disassembly is readily accomplished without having to damage either the bevel gear or the barrel and without having to replace both of them if only one needs replacement or repair. The barrel itself is mounted with bearing assemblies 63, 64. These bearings can, for example, be tapered roller bearings and can include the use of a seal 65 and a dust shield 66.

Referring further to the driven output tube or barrel 46, its bottom end portion includes a tapered surface 67 which tapers downwardly toward the bottom end of the barrel. A complementary tapered passageway 68 is provided along the central axis of the upper blade assembly 47. This tapered passageway 68 is through upper bar or blade holder 69 and hub 71. A shield ring 72 and a plurality of bolts 73 secure the upper bar 69 and thus the upper blade assembly 47 onto the barrel 46 in a removable and secure manner, with a seal 74 typically being included within this assembly. A split ring or collar 75 rests on a shoulder 76. When the bolts 73 are tightened, the blade assembly 47 is locked into place, while still providing an assembly that is easily completed and removed. Disassembly at this tapered engagement area also permits access to the seal 74 and bearing assembly 55 when same are in need of replacement or repair.

Lower blade assembly 48 is removably secured to the driven output shaft 45. Its bar or blade holder 77 is secured to the shaft 45 by being mounted up against a tapered spline 78. A splined assembly is illustrated. The securement means include washer 79 and appropriate nut and cotter pin assembly 81. Each blade 82 is secured to its respective bar 69, 77 in a pivoting manner to permit flail action by way of suitable mounting pins 83.

FIG. 4, FIG. 5 and FIG. 6 further illustrate the counter-rotating blade assemblies within a side deck or wing assembly 14 when in its upwardly disposed or raised position. It will be noted that the flail mounted blades 82 will kick out of the way when a foreign obstacle is encountered.

FIG. 7 depicts a rotary cutter 11 being pulled over a crop, such as the illustrated grass 92, in order to cut same. A portion of the rear of the tractor 91 is shown, including one of its rear wheels 93. It will be appreciated that, as the wheel 93 runs over the upstanding crop 92, that portion of the crop becomes matted down, forming a matted track 94. It will be further realized, as generally illustrated in FIG. 7, that the matted track tends to have an orientation as generally shown that is forwardly directed (toward the tractor).

This matting direction presents an especially difficult problem for rotary cutters such as those of the present invention which have multiple blades on multiple spindles. In multiple-spindle rotary cutters, the blades usually rotate over only a portion of the matted tracks left by a tractor or other towing vehicle such that the blade rotation swath is offset toward one side of the matted track. This is shown in FIG. 7 and is schematically illustrated in FIG. 8. On the left side (facing the direction of travel), the bulk of the lower blade rotation swath 95 is to the left of the matted track 94. By rotating this lower blade clockwise, the rotation direction is "against the grain" of the matted track 94, thus exerting a "lifting" force on the matted crop blades, stems, stalks or the like to "stand up" the crop as it is being cut by the lower blade traversing the path as indicated by the curved arrow designating the lower blade rotation swath 95.

With further reference to FIG. 8, this also shows a similar (but reverse rotational direction) situation on the right side.

The bulk of the right side lower blade rotation swath 96, is to the right (facing the direction of travel) of the other matted track 97. By rotating this lower blade counterclockwise, the rotation direction again is "against the grain" to facilitate cutting of the matted crop 97 by this blade.

The present invention allows one to select the rotational direction of the counterrotating upper and lower blades in order to achieve a lower blade pattern such as shown in FIG. 8. The pattern which is most advantageous for cutting matted crop will vary from cutter to cutter and (to a lesser extent) from towing vehicle to towing vehicle. The invention facilitates change in rotation as needed for the situation by providing easily exchangeable components within the counterrotation gearbox.

It will be understood that the embodiments of the present invention which have been described are illustrative of some of the applications of the principles of the present invention. Various modifications may be made by those skilled in the art without departing from the true spirit and scope of the invention.

We claim:

1. A rotary cutter apparatus with dual counterrotating blade assemblies for cutting and shredding vegetation, the rotary cutter apparatus comprising:

a deck assembly associated with at least one ground engagement member and an assembly for transporting the rotary cutter apparatus across a field of vegetation to be cut and shred;

an upper blade assembly rotatably mounted along said deck assembly so as to engage and cut vegetation over which said rotary cutter apparatus moves and which passes generally under said deck assembly;

a lower blade assembly rotatably mounted along said deck assembly so as to engage and cut vegetation over which said rotary cutter apparatus moves and which passes generally under said deck assembly, said lower blade assembly being below said upper blade assembly;

a blade gearbox and drive assembly secured to said deck assembly, said blade gearbox and drive assembly simultaneously driving both said upper blade assembly and said lower blade assembly;

said blade gearbox and drive assembly including a rotatably mounted driven output shaft in driving engagement with said lower blade assembly and a rotatably mounted driven output tube in driving engagement with said upper blade assembly, said output shaft passing through said output tube, and said blade assemblies being driven respectively by said output shaft and output tube in counterrotation with respect to each other;

said blade gearbox and drive assembly include a driven gear for the upper blade assembly and a driven gear for the lower blade assembly;

a multiple gear drive shaft having a first drive gear for engaging and driving said driven gear for the upper blade assembly and a second gear for engaging and driving said driven gear for the lower blade assembly; and said multiple gear drive shaft also has a first location and a second location therealong, said multiple gear drive shaft having an interchangeability characteristic such that said first location accommodates either said first drive gear or said second drive gear and such that said second location accommodates either said first drive gear or said second drive gear, whichever one is not accommodated by said first location, and said interchangeability characteristic determines the respective directions of counterrotation of said upper and lower blade assemblies.

2. The apparatus in accordance with claim 1, wherein said multiple gear drive shaft is an assembly of non-permanently connected components including said first and second drive gears as first and second drive gear components which are generally exchangeable with each other so as to provide said interchangeability characteristic.

3. The apparatus in accordance with claim 2, wherein said first and second drive gear components are spaced apart so as to be on opposing sides of the axis of said driven output shaft.

4. The apparatus in accordance with claim 3, wherein said first location and said second location are respectively on said opposing sides.

5. The apparatus in accordance with claim 1, wherein said multiple gear drive shaft is one of a plurality of shafts with permanently positioned members including said first and second drive gears, one of said shafts with permanently positioned members has said first drive gear at said first location and said second drive gear at said second location, and another of said shafts with permanently positioned members has said first drive gear at said second location and said second drive gear at said first location, and said plurality of shafts with permanently positioned members are generally exchangeable with each other within the gearbox so as to provide said interchangeability characteristic.

6. The apparatus in accordance with claim 1, wherein said first drive gear has diameter greater than the diameter of said second drive gear.

7. The apparatus in accordance with claim 1, wherein said first drive is spaced outwardly within said gearbox with respect to said second drive gear.

8. The apparatus in accordance with claim 1, wherein said first drive gear has diameter greater than the diameter of said second drive gear and is spaced outwardly within said gearbox with respect to said second drive gear.

9. The apparatus in accordance with claim 1, wherein said output shaft is mounted within said blade gearbox and drive assembly by only two bearing assemblies which are in axial alignment with each other.

10. The apparatus in accordance with claim 1, wherein said output tube is removably attached to said drive gear for the upper blade assembly so that either of said output tube or said drive gear for the upper blade assembly are replaceable without damage to the other.

11. The apparatus in accordance with claim 1, further including a lubrication bath within said gearbox within which are submerged at least a substantial portion of each of said drive gears, driven gears and bearing assemblies therefor.

12. The apparatus in accordance with claim 1, wherein said output tube and said upper blade assembly are removably secured to one another so that said upper blade assembly is removable without removal of or damage to said output tube or to said upper blade assembly.

13. The apparatus in accordance with claim 12, wherein said output tube has a downwardly tapering frusto-conical surface and said upper blade assembly has a complementary frusto-conical passageway through which the frusto-conical surface is inserted in a removable manner.

14. The apparatus in accordance with claim 13, wherein a lowermost one of said bearing assemblies is positioned inwardly and generally adjacent to said frusto-conical surface of the output tube.

15. The apparatus in accordance with claim 1, wherein at least one of said two bearing assemblies mounting the output shaft is a bearing assembly that accepts both upwardly directed and downwardly directed vertical loading of said output shaft.

16. A rotary cutter apparatus with dual counterrotating blade assemblies for cutting and shredding vegetation, the rotary cutter apparatus comprising:

a deck assembly associated with at least one ground engagement member and an assembly for transporting the rotary cutter apparatus;

an upper blade assembly rotatably mounted along said deck assembly so as to engage and cut vegetation over which said rotary cutter apparatus moves and which passes generally under said deck assembly;

a lower blade assembly rotatably mounted along said deck assembly so as to engage and cut vegetation over which said rotary cutter apparatus moves and which passes generally under said deck assembly, said lower blade assembly being below said upper blade assembly;

a blade gearbox and drive assembly secured to said deck assembly, said blade gearbox and drive assembly simultaneously driving both said upper blade assembly and said lower blade assembly;

said blade gearbox and drive assembly including a driven gear for the upper blade assembly and a driven gear for the lower blade assembly;

a multiple gear drive shaft having a first drive gear for engaging and driving said driven gear for the upper blade assembly and a second gear for engaging and driving said driven gear for the lower blade assembly; and said multiple gear drive shaft also has a first location and a second location therealong, said multiple gear drive shaft having an interchangeability characteristic such that said first location accommodates either said first drive gear or said second drive gear and such that said second location accommodates either said first drive gear or said second drive gear, whichever one is not accommodated by said first location, and said interchangeability characteristic determines the respective directions of counterrotation of said upper and lower blade assemblies.

17. The apparatus in accordance with claim 16, wherein said multiple gear drive shaft is an assembly of non-permanently connected components including said first and second drive gears as first and second drive gear components which are generally exchangeable with each other so as to provide said interchangeability characteristic.

18. The apparatus in accordance with claim 17, wherein said first and second drive gear components are spaced apart so as to be on opposing sides of the axis of said driven output shaft.

19. The apparatus in accordance with claim 18, wherein said first location and said second location are respectively on said opposing sides.

20. The apparatus in accordance with claim 16, wherein said multiple gear drive shaft is one of a plurality of shafts with permanently positioned members including said first and second drive gears, one of said shafts with permanently positioned members has said first drive gear at said first location and said second drive gear at said second location, and another of said shafts with permanently positioned members has said first drive gear at said second location and said second drive gear at said first location, and said plurality of shafts with permanently positioned members are generally exchangeable with each other within the gearbox so as to provide said interchangeability characteristic.

21. The apparatus in accordance with claim 16, wherein said first drive gear has diameter greater than the diameter of said second drive gear.

22. The apparatus in accordance with claim 16, wherein said first drive is spaced outwardly within said gearbox with respect to said second drive gear.

23. The apparatus in accordance with claim 16, wherein said first drive gear has diameter greater than the diameter of said second drive gear and is spaced outwardly within said gearbox with respect to said second drive gear.

24. The apparatus in accordance with claim 16, wherein said output shaft is mounted within said blade gearbox and drive assembly by only two bearing assemblies which are in axial alignment with each other.

25. The apparatus in accordance with claim 16, further including a lubrication bath within said gearbox within which are submerged at least a substantial portion of each of said drive gears, driven gears and bearing assemblies therefor.

* * * * *